United States Patent [19]

Couch et al.

[11] 4,137,049
[45] Jan. 30, 1979

[54] DEVICE FOR USE AS AN ELAPSED TIME INDICATOR OR TIME TEMPERATURE INDICATOR

[75] Inventors: Thomas W. Couch, Asheville; James A. Harvey, Enka; Gerardus L. J. Tummers, Asheville, all of N.C.

[73] Assignee: Akzona Incorporated, Asheville, N.C.

[21] Appl. No.: 795,582

[22] Filed: May 10, 1977

[51] Int. Cl.$^2$ .................. G01D 13/00; G01N 31/06; G01N 31/22

[52] U.S. Cl. .................................... 422/56; 73/356; 116/206; 422/57; 422/58

[58] Field of Search .................. 73/356; 116/114 AM, 116/114 AC; 23/253 TP

[56] References Cited

U.S. PATENT DOCUMENTS

| | | | |
|---|---|---|---|
| 2,487,077 | 11/1949 | Shepherd | 23/253 TP |
| 3,528,780 | 9/1970 | Radowski | 23/253 TP |
| 3,530,040 | 9/1970 | Shrawder et al. | 23/23 B X |
| 3,620,677 | 11/1971 | Morison | 23/253 TP |
| 3,784,358 | 1/1974 | Drake, Jr. | 23/253 TP |
| 3,932,134 | 1/1976 | Fang et al. | 23/253 TP |
| 3,946,611 | 3/1976 | Larsson | 73/356 |
| 3,954,011 | 5/1976 | Manske | 73/356 |
| 3,962,920 | 6/1976 | Manske | 23/253 TP X |
| 3,996,007 | 12/1976 | Fang et al. | 23/253 TP |
| 4,042,336 | 8/1977 | Larsson | 23/253 TP |

Primary Examiner—Morris O. Wolk
Assistant Examiner—Michael S. Marcus
Attorney, Agent, or Firm—Francis W. Young; David M. Carter

[57] ABSTRACT

An indicator device for use as a time indicator or a time-temperature indicator. A container is provided for housing a frangible capsule and a porous carrier. A vapor generating chemical is enclosed in the capsule. A mixture, including a second chemical, a pH change responsive indicator, and a gel forming agent are impregnated in the porous carrier. The pH of the vapor is different from the second chemical. A gel is formed from the mixture and provides uniform dispersion of the second chemical and the indicator throughout the porous carrier, as well as provides an impedance to the vapor as it moves through the porous carrier. The device is thus useful as an elapsed time indicator for certain temperature ranges as well as a time-temperature indicator for wider temperature ranges.

19 Claims, 3 Drawing Figures

DEVICE FOR USE AS AN ELAPSED TIME INDICATOR OR TIME TEMPERATURE INDICATOR

BACKGROUND OF THE INVENTION

This invention relates to an improved elapsed time indicator or time temperature indicator. More particularly, it relates to time indicator or time temperature indicator having a vapor generating means and a porous carrier impregnated with a mixture of a gel-forming agent, and acid or base, and a pH sensitive indicator responsive to the movement of the vapor.

For certain applications, it has been shown that there is a need to detect the elapse of predetermined time periods using an indicator which is relatively independent of temperature change for certain temperature ranges, such as between 16° C. and 27° C. One such need exists for use with intravenous tubing in hospitals. Under current protocol, hospital personnel should change the intravenous tubing which is in use approximately every 24 hours. The tubing should be changed primarily due to the possibility of infection and because it tends to become clogged if used for a much longer time period. However, studies have shown that quite often this tubing is not changed every 24 hours because there is no reliable and inexpensive means to indicate that the tubing has been in use for a period of over 24 hours. Since the temperature in a hospital room is kept fairly constant, radical changes in temperature need not be considered during use. However, a time indicator device for such use should be relatively stable between about 16° C. and 27° C. Furthermore, it should be designed so that it may be readily and clearly attached to the tubing to be monitored. It should also be easily activated by hospital personnel.

OBJECTS OF THE INVENTION

It is, therefore, one object of the invention to provide an improved elapsed time indicator device.

It is another object to provide a device for use as an elapsed time indicator for certain temperature ranges and a time-temperature indicator for other temperature ranges.

It is another object of this invention to provide a time indicator and/or time-temperature indicator with an improved indicator and chemical dispersion medium and time rate control medium.

SUMMARY OF THE INVENTION

In accordance with one form of this invention, there is provided an elapsed time indicator and/or time-temperature indicator including a container. A vapor generating means having a first chemical is enclosed in the container. A means for activating the vapor generating means is provided. A carrier is included in the container having a mixture of a gel forming agent and an indicator, and a second chemical deposited therein. The mixture has a viscosity of sufficient value to hold the second chemical and the indicator substantially uniformly dispersed in the carrier and also to provide the impedance to the movement of the vapor through the carrier, whereby a substantially accurate indication of the elapse of a predetermined time after activation of the vapor generating means is indicated for certain temperature ranges and the integration of time and temperature is indicated for other temperature ranges.

BRIEF DESCRIPTION OF THE DRAWINGS

The subject matter which is regarded as the invention is set forth in the appended claims. The invention itself, however, together with further objects and advantages thereof, may be better understood with reference to the following description taken in conjunction with accompanying drawings in which:

DESCRIPTION OF THE PREFERRED EMBODIMENTS

Figure 1:
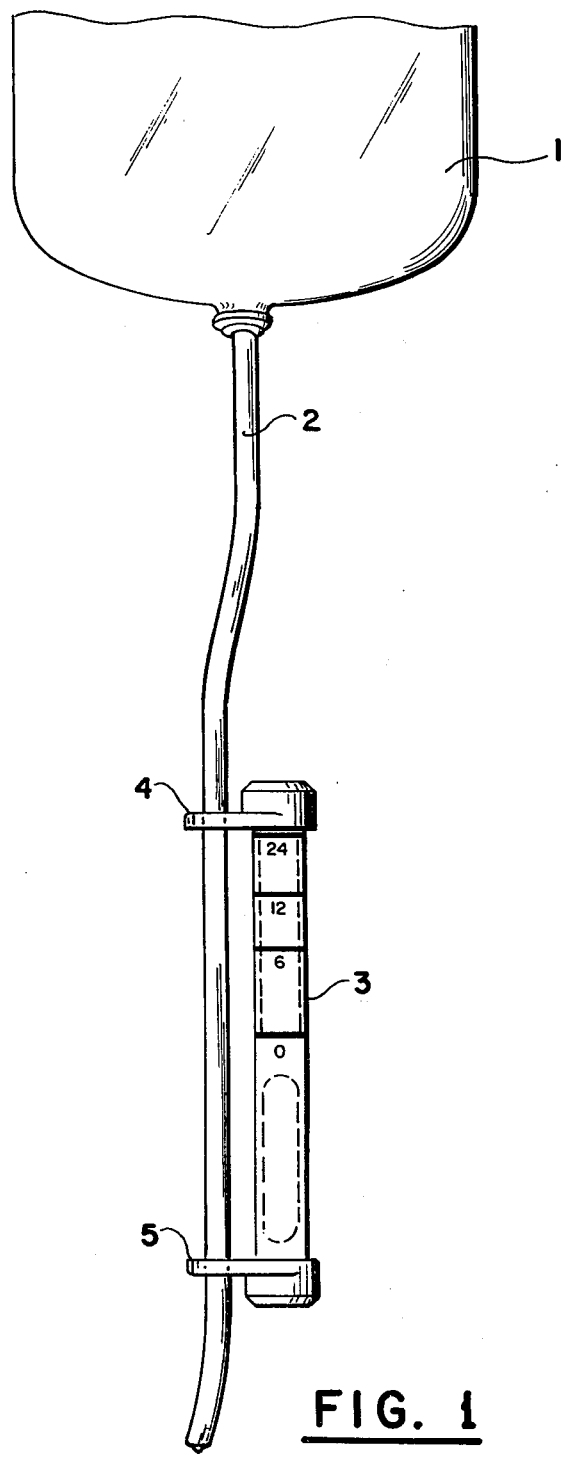
FIG. 1 is a side view of an elapsed time indicator attached to intravenous tubing.

Referring now more particularly to FIG. 1, there is shown a portion of an intravenous fluid bottle 1. The intravenous fluid bottle is connected to an intravenous fluid tubing 2, which may be made of a plastic material. It is the inside walls of such tubing as well as the associated needle which may become clogged after a certain use time. Elapsed time indicator 3 is attached to intravenous tubing 2 by clamps 4 and 5 to provide an indication of the passage of a certain period of time, for example, twenty-four hours. The structure of the elapsed time indicator 3 includes tube 6 which, in this embodiment, is made of substantially clear and substantially rigid polyvinylchloride having a wall dimension thin enough to allow for collapse upon mechanical stress such as finger pressure. A vapor generating means includes a crushable glass ampul 7. Ampul 7 contains chemical 8, which may be in either a solid, a liquid, or a gas phase. Chemical 8 may be either an acid or a base having a substantial vapor pressure. Glass ampul 7 may be crushed by hand through the polyvinylchloride tube 6 to activate vapor flow. The top part of tube 6 contains a porous polymer material plug 9. In this embodiment, the plug is a commercially available Porex* material. Porex plug 9 has annular shoulder 10 for holding it in place in the tube 6. Annular shoulders 10 abut against rim 11 of the tube.

*Porex is a trademark of Glassrock Products, Inc.

In this embodiment, the Porex plug has a 40% void volume and a void size of approximately 20 microns. A second chemical which is either an acid or a base, but in any event, has a pH different from the pH of the vapor from the first chemical 8 in the vapor generating means 7 is also provided. The second chemical is mixed with a pH sensitive indicator such as, for example, phenol red and also with a viscosity control medium or gel-forming agent such as, for example, a gelatin. Water may also be added to the mixture. The mixture is impregnated into the plug and allowed to gel. The gelled mixture is of such viscosity to act as an impedance to the movement of the vapor from the chemical 8 through the Porex plug 9 and also to maintain a substantially uniform distribution of the indicator and the second chemical in the Porex plug. Examples of gel forming agents include polysaccharids and agars. However, other gels and mediums may be used.

The ends 12 and 13 of tube 6 are covered with caps 14 and 15, respectively. Caps 14 and 15 also are integral with clamps 16 and 17, respectively. Clamps 16 and 17 secure the indicator device onto intravenous tubing 2 as shown in FIG. 1.

Caps 14 and 15 should fit rather snuggaly against ends 12 and 13 of tube 6 in order to maintain a relative constant pressure inside tube 6 and to prevent moisture from entering the tube. It may be helpful to glue the caps to the tube. Indicia means 18, in the form of a label, is attached to tube 6, and is aligned with Porex plug 9. Indicia means 18, in this embodiment, has four lines which respectively indicate the passage of six, twelve, eighteen, and twenty-four hour periods.

In the device described above, it has been shown that various mixtures including a gel-forming agent, a chemical, and a pH sensitive indicator in gel solution, the mixture of which having viscosities in the range of from 10 centipoise to 380 centipoise at 25° C., in combination with a vapor generating chemical which has a pH differing from the first chemical and which has a vapor pressure from about 10 atmospheres to about 0.1 atmosphere at 25° C. will provide substantially accurate elapse time indicator for a temperature range from about 16° C. to about 27° C.

In one embodiment, the chemical 8 in the vapor generating capsule 7 was solid ammonium carbonate which releases ammonia vapor. The acid in the Porex plug 9 was acetic acid, the indicator was phenol red, and the gel forming agent a polysaccharid. Also, water comprised approximately 85% by weight of the total mixture. The water was impregnated into the Porex plug to aid in the reaction of the acid and base. After the crushable ampul 7 was broken, the ammonia vapor traveled through the Porex material reacting with the acetic acid and causing a rise in the pH in the plug. The phenol red turned from yellow to red, thus showing a red color front moving up the Porex material such that the 1¼" rod was completely red after a period of 24 hours at a temperature of 25° C. In other experiments, it was shown that the same concentrations and the same materials as above were used at a temperature of 16° C. The time taken for the red front to move completely up the Porex rod was approximately 26 hours. At a temperature of 27° C., it was shown that the time taken for the color front to move up the rod was approximately 22 hours. Thus, it was shown that the temperature indicator was relatively temperature independent for the worst case extreme ranges which may occur in reasonably controlled environments such as, for example, in hospitals.

The gel acts to plug the pores in the porous polymer material causing impedance to the movement acid or base vapor therethrough, thus controlling the movement of the pH sensitive indicator color front. Because of this impedance and the particular chemicals selected, the device shows a relatively low dependence on temperature, at least, in the above ranges.

Figure 3:
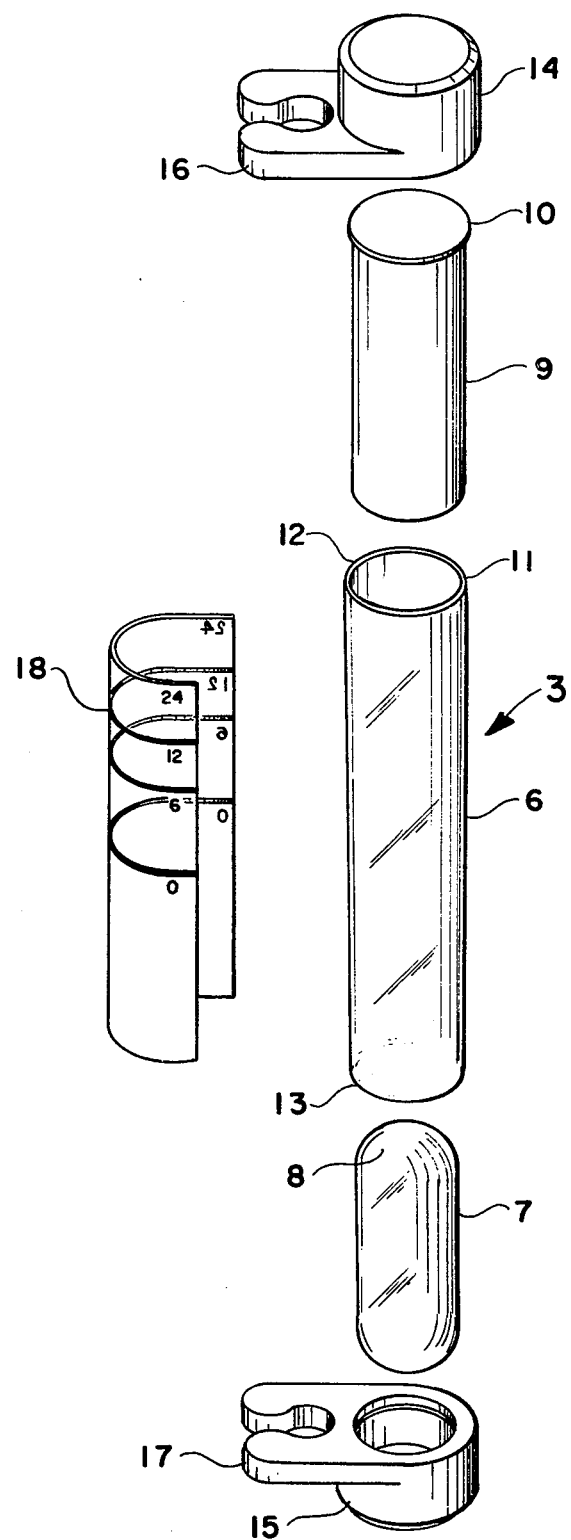
FIG. 3 is an exploded isometric view of the indicator of FIG. 2.

In another embodiment, using the physical structure of FIG. 3, a Porex rod was impregnated with a mixture of 0.03 Molar Citric Acid, 0.2% by weight Phenol Red, and 10% by weight of a gel-forming agent consisting of 275 bloom rate polysaccharid in a water solution. The viscosity of the mixture is 35 centipoise at 25° C. The vapor generating means which was enclosed in a glass ampule, was ammonia hydroxide ($NH_4OH$) which has a vapor pressure of 10 atmosphere at 25° C. Approximately twenty-four hours after breaking the glass ampule, a red color front had travelled the entire length of the 1¼" Porex rod at a temperature of 25° C.

Some other examples of mixtures of gel-forming agents, acids, bases, and indicators which have been shown to provide acceptable results for time indicators are included below. The percentages given are by weight. In all of the examples, the mixtures in the rods form a gel after the rods are impregnated.

EXAMPLE 1

Ampul: Fill half of ampul space (⅜") with solid ammonium carbonate ($NH_4)CO_3$

Porex Rod: Impregnate with mixture including 0.15 molar tartaric acid, 0.1% bromocresol purple (BCP), 1% agar in water solution.

EXAMPLE 2

Ampul: Same as 1.

Porex Rod: Impregnate with mixture including 0.15 molar tartaric acid, 1% agar, 0.1% BCP in a glycerol solution.

EXAMPLE 3

Ampul: Same as 1.

Porex Rod: Impregnate with mixture of 0.15 molar tartaric acid, 1% BCP in hot solution of 95% ethanol and 5% methanol and evaporate the solvent with two drops Atlas DHL 128 surfactant.

EXAMPLE 4

Ampul: Fill half of ampul space (⅜") with mixture of 6 molar $NH_4OH$ and 1% agar in water solution;

Porex Rod: Impregnate with mixture of 0.15 molar tartaric acid, 0.1% BCP, 1% agar in water solution.

EXAMPLE 5

Ampul: Same as 4.

Porex Rod: Same as 4 except replace tartaric acid with citric acid.

EXAMPLE 6

Ampul: Fill half of space (⅜") with 6 normal HOAC (acetic acid).

Porex Rod: Impregnate rod with mixture of 0.1 molar THAM [tris-(hydroxymethyl)-amino methane], 0.1% BCP, 1% agar in water.

EXAMPLE 7

Ampul: Fill half of space with 1¼" Porex rod, saturated with 6 normal acetic acid solution.

Porex Rod: Impregnate rod with mixture of 0.1 molar THAM, 0.1% BCP, 1% agar in water solution.

EXAMPLE 8

Ampul: Fill half of space (⅜") with mixture of 6 normal acetic acid plus 1% agar in water solution.

Porex Rod: Impregnate rod with mixture of 0.1 molar THAM, 0.1% BCP, 1% agar in water solution.

EXAMPLE 9

Ampul: Same as 8.

Porex Rod: Impregnate rod with solution of 0.1 molar THAM, 0.1% BCP, 1% agar in solution of 10% glycerol and 90% water.

EXAMPLE 10

Ampul: 1¼" rod, saturated with 6 normal $NH_4OH$.

Porex Rod: Impregnate with 0.3 molar citric acid in 80/20 water/glycerol solution, 0.1% BCP and 1% agar.

EXAMPLE 11

Ampul: 1¼" rod, saturated with 6 normal $NH_4OH$.

Porex Rod: Same as 10 except added 2 drops per 100 ml. surfactant Atlas DHL 128.

EXAMPLE 12

Ampul: Same as 11.
Porex Rod: Same as 11 except replace water/glycerol solution with solution of 95% ethanol, 5% methanol.

EXAMPLE 13

Ampul: 6 normal acetic acid in a Porex rod.
Porex Rod: Mixture of 0.05 molar NaOH, 0.2% BCP, 1% agar in water solution.

EXAMPLE 14

Ampul: Same as 13.
Porex Rod: Same as 13 except replace water with solution of 20% water, 20% glycerol, 60% methanol.

EXAMPLE 15

Ampul: 6 normal $NH_4OH$ in Porex
Porex Rod: Porex rod is shrunk into heat shrinkable Teflon; then, impregnated in mixture of 0.3 M citric acid, 0.2% BCP, 1% agar in water solution.

EXAMPLE 16

Ampul: Same as 15.
Porex Rod: Impregnate rod with mixture of 0.3 M citric acid, 0.2% BCP, 1% agar in water solution, then Porex is heat shrunk in Teflon.*
*Teflon is a trademark of E. I. du Pont de Nemours Company.

EXAMPLE 17

Ampul: Johnson & Johnson's ammonia inhalant mixture.
Porex Rod: 0.3 M citric acid, 0.2% BCP, 1% agar in water solution.

EXAMPLE 18

Ampul: Porex saturated with 6 normal $NH_4OH$.
Porex Rod: Impregnate with mixture of 0.3 M citric acid, 0.2% BCP, 1% agar 20/20/60 water/glycerol/-methanol solution.

EXAMPLE 19

Ampul: Charcoal pellets impregnated with 6 normal $NH_4OH$.
Porex Rod: 0.3 M citric acid, 0.2% BCP, 1% agar in water solution.

EXAMPLE 20

Ampul: Ammonium chloride or ammonium carbonate powdered tablets (approximately 1–2 milligrams).
Porex Rod: 0.3 M citric acid, 0.2% BCP, 1% agar in water.

Figure 2:
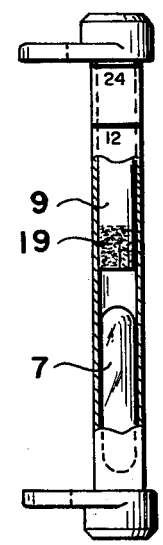
FIG. 2 is a side view of an indicator incorporating some of the features of the present invention.

An example of a partially expired time indicator is shown in FIG. 2. As can be seen, ampul 7 has been fractured, liberating, in this embodiment, ammonia vapors in the container. A color front travels up Porex plug 9 as indicated by the leading edge 19. In some of the examples discussed above, a basic material was used in the ampul and acid was used in the porous plug. The chemicals may readily be reversed; that is, an acid may be used in the crushable ampul and a base used in the plug.

Furthermore, it has been found that for smaller pore sizes of the carrier, lower viscosity gels may be used. It is contemplated that for pore sizes between 0.1 and 5 microns, the porous material itself may act as a substantial enough impedance to the vapor as well as provide sufficient homogenous dispersion of the second chemical and the indicator to be an acceptable time indicator in the temperature ranges from 16° C. to 27° C. as well as a time-temperature indicator for wider ranges.

So it can be seen that a device for indicating the passage of time for certain temperature ranges varying between 16° C. and 27° C. is provided. However, this device may also operate as a time-temperature indicator which is especially useful in integrating time and temperature over a wide range of temperatures such as between 0° F. and 100° F.

The movement of the color front through the mixture is dependent on many variables, however, by utilizing an impedance to the vapor movement such as a gel and/or microporous carrier, the effect of temperature changes on such movement is dramatically reduced from what one would expect during an acid-base reaction.

From the foregoing description of the embodiments of the invention, it will be apparent that many modifications may be made therein. It will be understood, however, that these embodiments are intended merely as exemplifications of the invention and that the invention is not limited thereto. It should be understood, therefore, that it is intended that the appended claims cover all such modifications in the true spirit and scope of the invention.

What is claimed is:

1. A device for indicating the elapse of time comprising: a container, a vapor generating means enclosed in said container, said vapor generating means including a first chemical having a vapor pressure, a carrier enclosed in said container, a mixture including a second chemical, an indicator, and a gel forming agent impregnated in said carrier; the longitudinal outer surface of said mixture being in contact with a portion of the longitudinal inner surface of said container, said second chemical having a pH value different from said first chemical, said indicator responsive to a change in PH value due to the reaction of said first and second chemicals; the viscosity of said mixture impregnated in said carrier being of such a value so as to provide that said second chemical and said indicator are substantially uniformly held in a dispersion in said carrier and further to provide an impedance to the movement of the vapor through said carrier, whereby substantially accurate indication of the elapse of a predetermined time after activation of said vapor generating means is indicated for certain temperature ranges.

2. A device as set forth in claim 1 wherein said mixture forms a gel after impregnation into said carrier, said gel having a viscosity between 10 and 380 centipoise at 25° C.

3. A device as set forth in claim 1 wherein the vapor pressure of said first chemical is between 0.1 and 10 atmospheres at 25° C.

4. A device as set forth in claim 1 further including indicia means, said indicia means being attached to said container for indicating the passage of certain time intervals.

5. A device as set forth in claim 1 wherein said first chemical is a basic material, and said second chemical is an acidic material.

6. A device as set forth in claim 1, wherein said mixture includes 50% to 99% water by weight.

7. A device as set forth in claim 1 wherein said gel-forming agent is taken from the group consisting of polysaccharid and an agar.

8. A device as set forth in claim 1 wherein said carrier is a porous polymer having void volume in the range from 10% to 50% and void size of between 5 to 100 microns.

9. A device as set forth in claim 1 wherein said indicator is phenol red.

10. A device as set forth in claim 1 wherein said carrier is a porous material.

11. A device as set forth in claim 10 wherein said carrier is in the shape of a cylindrical plug.

12. A device as set forth in claim 1 wherein said container is substantially impermeable to moisture.

13. A device as set forth in claim 12 wherein said container is coated with polyvinylidene chloride.

14. A device as set forth in claim 1 wherein said first chemical is an acidic material and said second chemical is a basic material.

15. A device as set forth in claim 14 wherein said first chemical is an ammonia-releasing compound and said second chemical is a weak acid.

16. A device as set forth in claim 15 wherein said first chemical is ammonium hydroxide and said second chemical is citric acid.

17. A device for use as a time indicator or time temperature indicator comprising: a container, a vapor generating means including a first chemical received in said container, a porous material being impregnated with a mixture including a second chemical, a pH sensitive indicator, and a gel forming agent, said gel forming agent uniformly holding said second chemical and said pH sensitive indicator in said porous material and for providing an impedance to the flow of the vapor through said porous material; said mixture having a viscosity greater than 10 centipose at twenty five degrees centigrade; said porous material being located inside said container; the vapor of said first chemical having a pH value different from said second chemical.

18. A device as set forth in claim 17 wherein the time indicator temperature range is from 16° C. to 27° C.

19. A time indicating device comprising: a substantially moisture impermeable tube; a frangible ampule contained in said tube; said frangible ampule containing an ammonia vapor releasing compound, a porous polymer plug contained in said tube and being impregnated with a mixture of a weak acid, a pH change indicator, a gel forming agent and water; said gel forming agent uniformly holding said weak acid and said pH change indicator in said porous polymer plug and providing an impedance to the flow of ammonia vapor through said porous polymer plug; indicia means in register with said plug for indicating time information; whereby, upon the fracture of said frangible ampule, an indicator front moves up said plug approximately in proportion to the time interval which is shown on said indicia means.

* * * * *